(12) United States Patent
Raglin

(10) Patent No.: US 9,624,765 B2
(45) Date of Patent: Apr. 18, 2017

(54) LASER POSITION FINDING DEVICE USED FOR CONTROL AND DIAGNOSTICS OF A ROD PUMPED WELL

(71) Applicant: Spirit Global Energy Solutions, Inc., Midland, TX (US)

(72) Inventor: John M. Raglin, Midland, TX (US)

(73) Assignee: Spirit Global Energy Solutions, Inc., Midland, TX (US)

( * ) Notice: Subject to any disclaimer, the term of this patent is extended or adjusted under 35 U.S.C. 154(b) by 0 days.

(21) Appl. No.: 14/465,605

(22) Filed: Aug. 21, 2014

(65) Prior Publication Data

US 2015/0055142 A1 Feb. 26, 2015

Related U.S. Application Data

(60) Provisional application No. 61/868,315, filed on Aug. 21, 2013.

(51) Int. Cl.
| | |
|---|---|
| *G01B 11/14* | (2006.01) |
| *E21B 47/09* | (2012.01) |
| *E21B 47/00* | (2012.01) |
| *G01B 11/00* | (2006.01) |

(52) U.S. Cl.
CPC .......... *E21B 47/09* (2013.01); *E21B 47/0008* (2013.01); *G01B 11/002* (2013.01)

(58) Field of Classification Search
CPC ........ F04B 47/02; F04B 49/065; F04B 51/00; G01S 17/08; E21B 47/09; G01B 11/14

USPC .......... 356/614–623, 241.1, 241.04, 241.06; 417/44.1, 904, 63, 212, 415; 73/152.61
See application file for complete search history.

(56) References Cited

U.S. PATENT DOCUMENTS

| | | | | |
|---|---|---|---|---|
| 4,286,925 | A | * 9/1981 | Standish | ............... F04B 49/065 417/12 |
| 4,487,061 | A | 12/1984 | McTamaney et al. | |
| 4,541,274 | A | * 9/1985 | Purcupile | ............ E21B 47/0008 166/105 |
| 4,973,226 | A | * 11/1990 | McKee | ............... E21B 47/0008 417/18 |
| 5,167,490 | A | * 12/1992 | McKee | ............... E21B 47/0008 417/12 |
| 5,224,834 | A | * 7/1993 | Westerman | ......... E21B 47/0008 417/12 |
| 5,267,016 | A | 11/1993 | Meinzer et al. | |

(Continued)

OTHER PUBLICATIONS

Shinohara, S. et al., "Compact and High-Precision Range Finder with Wide Dynamic Range and Its Application", Instrumentation and Measurement, IEEE transactions vol. 41, Issue 1, Aug. 6, 2002.

*Primary Examiner* — Hoa Pham
(74) *Attorney, Agent, or Firm* — Russell T. Manning; Marsh Fischmann & Breyfogle LLP

(57) ABSTRACT

A system for determining rod position in a rod pumped well is described that includes a laser unit mounted on an underside of the walking beam and a reflector plate mounted on the sampson post of the rod pumped well in a position near the laser unit. The laser transmits a beam onto the reflector plate allowing the laser unit to determine the distance between the laser and the reflector plate. The distance between the laser and reflector plate as determined by the laser is transmitted to a controller which calculates the position of the rod in the rod pumped well based on the distance determined by the laser.

8 Claims, 4 Drawing Sheets

(56) References Cited

U.S. PATENT DOCUMENTS

| | | | | |
|---|---|---|---|---|
| 5,362,206 | A | * | 11/1994 | Westerman ............ F04B 49/065 417/12 |
| 6,176,682 | B1 | * | 1/2001 | Mills ................... E21B 47/0006 417/12 |
| 6,473,189 | B1 | * | 10/2002 | Reedy .................. G01B 11/026 250/559.31 |
| 9,004,166 | B2 | * | 4/2015 | Raglin .................. E21B 43/127 166/105.5 |
| 2004/0144529 | A1 | * | 7/2004 | Barnes ................... F04B 47/02 166/53 |
| 2005/0095140 | A1 | * | 5/2005 | Boren ................... F04B 47/022 417/42 |
| 2006/0271298 | A1 | * | 11/2006 | MacIntosh ............... G01V 3/38 702/5 |
| 2008/0240930 | A1 | * | 10/2008 | Palka ................... E21B 43/127 417/42 |
| 2012/0020808 | A1 | | 1/2012 | Lawson et al. |
| 2013/0104645 | A1 | * | 5/2013 | Pons ..................... F04B 49/065 73/152.61 |

* cited by examiner

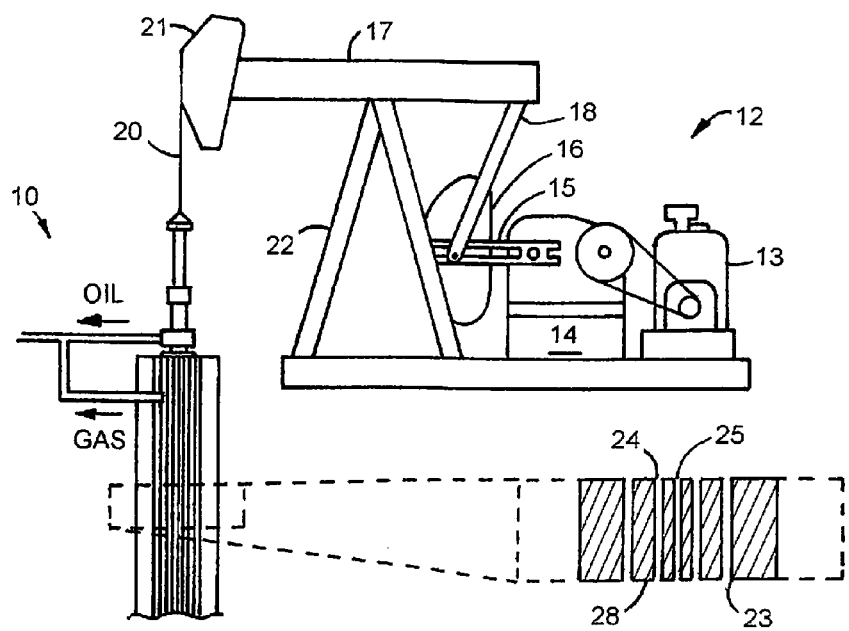
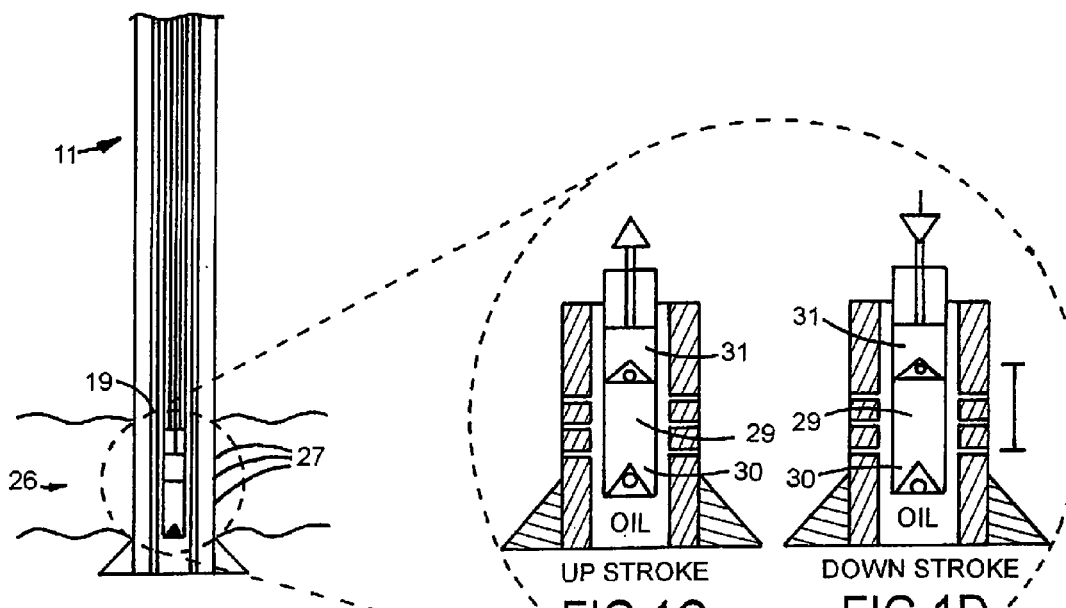
FIG. 1B (Prior Art)
FIG. 1A (Prior Art)
FIG. 1C (Prior Art)
FIG. 1D (Prior Art)

LASER POSITION FINDING DEVICE USED FOR CONTROL AND DIAGNOSTICS OF A ROD PUMPED WELL

CROSS REFERENCE TO RELATED INFORMATION

This application claims the benefit of U.S. Provisional Patent Application No. 61/868,315, filed Aug. 21, 2013, tiled "Laser Position Finding Device Used for Control and Diagnostics of a Rod Pumped Well", the contents of which are hereby incorporated herein in its entirety.

TECHNICAL FIELD

The present disclosure is directed to systems and methods for producing dynographs for rod pumped wells, and more particularly to a laser positioning system to determine the position of the rod in a rod pumped well.

BACKGROUND OF THE INVENTION

Many controllers for rod pumped oil and gas wells produce graphs called "dynographs" that plot the measured load on the rod against the position of the rod in the pumping stroke. An example of this type of graph is shown in FIG. 3. Inherent in the accuracy of this type of information is the accuracy of the measurement of the rod position. Currently, there are several mechanisms for measuring the rod position. One method uses Hall-effect transducers to model the position of the rod based on the geometry of the pump. Another method uses inclinometers mounted on the walking beam to detect the angle of the walking beam and derive a rod position from the angle. Other methods uses combinations of load sensors to measure beam flex and an inclinometer for beam angle to calculate rod position.

Each of these methods has inherent inaccuracies that can lead to inaccurate dynographs and data. What is needed is a more accurate mechanism for determining rod position in a pumping stroke.

BRIEF SUMMARY OF THE INVENTION

In a preferred embodiment, a system for determining rod position in a rod pumped well includes a laser mounted on the well and a reflector plate mounted in a position near the laser such that the laser can transmit a beam onto the reflector plate thereby determining a distance between the laser and the reflector plate. The distance between the laser and reflector plate as determined by the laser is indicative of the position of the rod in the rod pumped well.

In another preferred embodiment, a method for determining rod position in a rod pumped well includes mounting a laser on the well and mounting a reflector plate in a position near the laser such that the laser can transmit a beam onto the reflector plate. The method then determines a distance between the laser and the reflector plate, wherein the distance between the laser and reflector plate as determined by the laser is indicative of the position of the rod in the rod pumped well.

In yet another embodiment, a system for determining rod position in a rod pumped well includes a laser unit mounted on an underside of a walking beam of the rod pumped well and a reflector plate mounted on a sampson post of the rod pumped well in a position near the laser unit such that the laser can transmit a beam onto the reflector plate. A distance between the laser and the reflector plate is determined by the laser unit using the beam. The distance between the laser and reflector plate as determined by the laser is then transmitted to a controller which calculates the position of the rod in the rod pumped well based on the distance determined by the laser.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which:

FIG. 1A is a side view of a rod pumped well;

FIG. 1B is a detail view of a well bore in a rod pumped well;

FIGS. 1C and 1D are detail views of the up stroke and down stroke, respectively, of the pumping portion of a rod pumped well;

DETAILED DESCRIPTION OF THE INVENTION

Figure 2A:
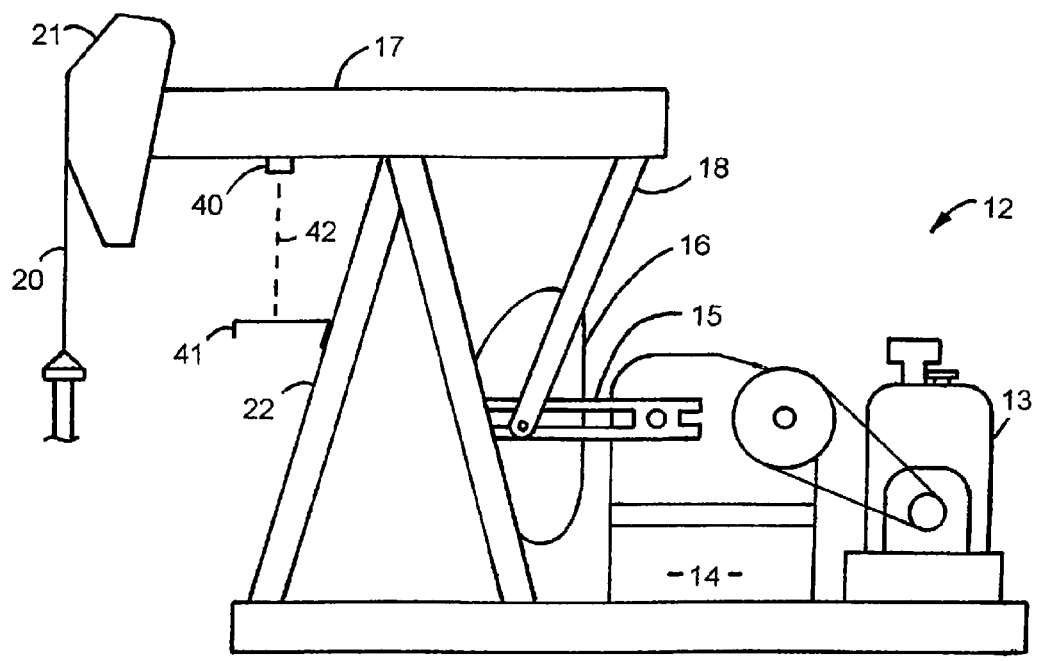
FIGS. 2A and 2B are side views of a rod pumped well with an embodiment of a position measuring device according to the concepts described herein in a mid-stroke and an up stroke position, respectively.

Load and position measurement and the drawing of dynograph cards, shown in FIG. 3 and discussed in more detail below, is the best option available today for controlling and running diagnostics on a rod pumped well. Load is pretty easy and most accurately determined by squeezing a load cell between the polished rod clamp and the carrier bar of the pumping unit. Determination of actual rod position is more elusive. As described, most devices don't measure position, they model position. Modeling leads to inaccuracy and requires the need for pumping unit geometry input (which input incorrectly leads to more error).

An embodiment of a system and method according to the concepts described herein uses a laser positioning device on a rod pumped oil and or gas well to obtain the polished rod and or pumping unit position utilizing. The system is used in conjunction with a load measuring device to provide load vs position data and draw surface and down hole cards for control and diagnostics of a rod pumped well. The system and method according to the present invention provides increased accuracy over prior methods including accuracy to within hundredths of an inch. The device is also safer as it requires no climbing by workers and allows for quicker installation and less maintenance than traditional methods.

FIGS. 1A through 1D show a diagram of a typical sucker rod pump used in oil wells is described. The sucker rod pump is described only for the purposes of illustrating the operation of a typical rod pumped oil well and is not intended to be limiting in any manner as the present invention. Well 10 includes well bore 11 and pump assembly 12. Pump assembly 12 is formed by a motor 13 that supplies power to a gear box 14. Gear box 14 is operable to reduce the angular velocity produced by motor 13 and to increase the torque relative to the input of motor 13. The input of motor 13 is used to turn crank 15 and lift counter weight 16. As crank 15 is connected to walking beam 17 via pitman arm 18, walking beam 17 pivots and submerges plunger 19 in well bore 11 using bridle 20 connected to walking beam 18 by horse head 21. Walking beam 17 is supported by sampson post 22.

Well bore 11 includes casing 23 and tubing 24 extending inside casing 23. Sucker rod 25 extends through the interior of tubing 24 to plunger 19. At the bottom 25 of well bore 11 in oil bearing region 26, casing 23 includes perforations 27 that allow hydrocarbons and other material to enter annulus 28 between casing 23 and tubing 24. Gas is permitted to separate from the liquid products and travel up the annulus where it is captured. Liquid well products collect around pump barrel 29, which contains standing valve 30. Plunger 19 includes traveling valve 31. During the down stroke of the plunger, traveling valve is opened and product in the pump barrel is forced into the interior of tubing 24. When the pump begins its upstroke, traveling valve 31 is closed and the material in the tubing is formed forced up the tubing by the motion of plunger 19. Also during the upstroke, standing valve 30 is opened and material flows from the annulus in the oil bearing region and into the pump barrel.

Figure 2B:
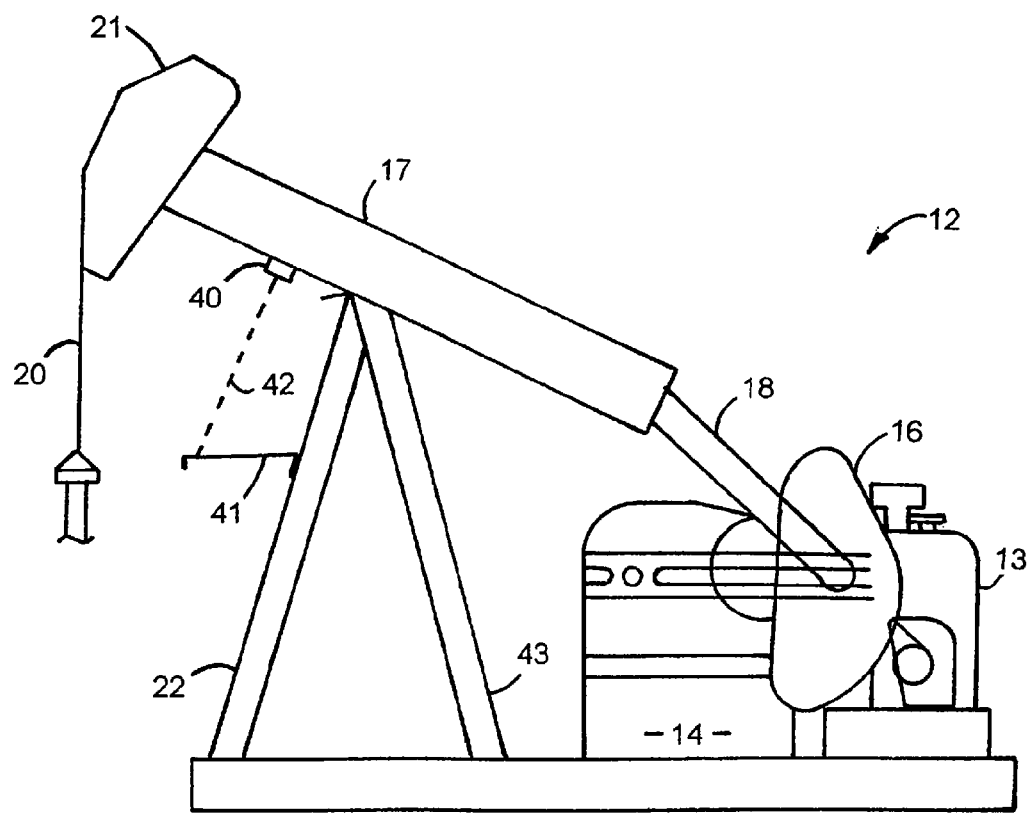

Referring now to FIGS. 2A and 2B, an embodiment of a rod position determination mechanism according to the concepts described herein is shown. A traditional rod pumped well 12 incorporates a laser 40 and reflector plate 41 positioning system. In preferred embodiments the laser 40 may be mounted on the underside of the walking beam 17 with a reflector plate 41 mounted on the Sampson post 22. In preferred embodiments the reflector plate is a foot or two below the laser unit, though any distance between the laser and reflector plate is well within the scope of the invention. An example of an appropriate laser unit for use in the present system is the DT35 from the SICK Group. The laser 40 shines a beam 42 on the reflector plate 41 and the distance between the laser and the reflector plate is measured by the laser unit 40. This distance between the laser 40 and reflector plate 41 can be converted into an accurate rod position by the laser unit, or by a control unit (not shown).

Mounting on the underside of the Sampson beam 17 allows the laser device 40 to be protected from the elements, but the laser unit may be mounted anywhere on the well where an associated reflector plate can also be mounted to allow for accurate distance measurements. In one embodiment, the system may be used with a portable dynamometer. Portable dynamometers are often attached to the polished rod to provide temporary measurements of the load on the rod. The laser unit of the present system may be placed on the portable dynamometer with the reflector plate being mounted on the well head to allow the laser unit to measure the relative distance.

Figure 3:
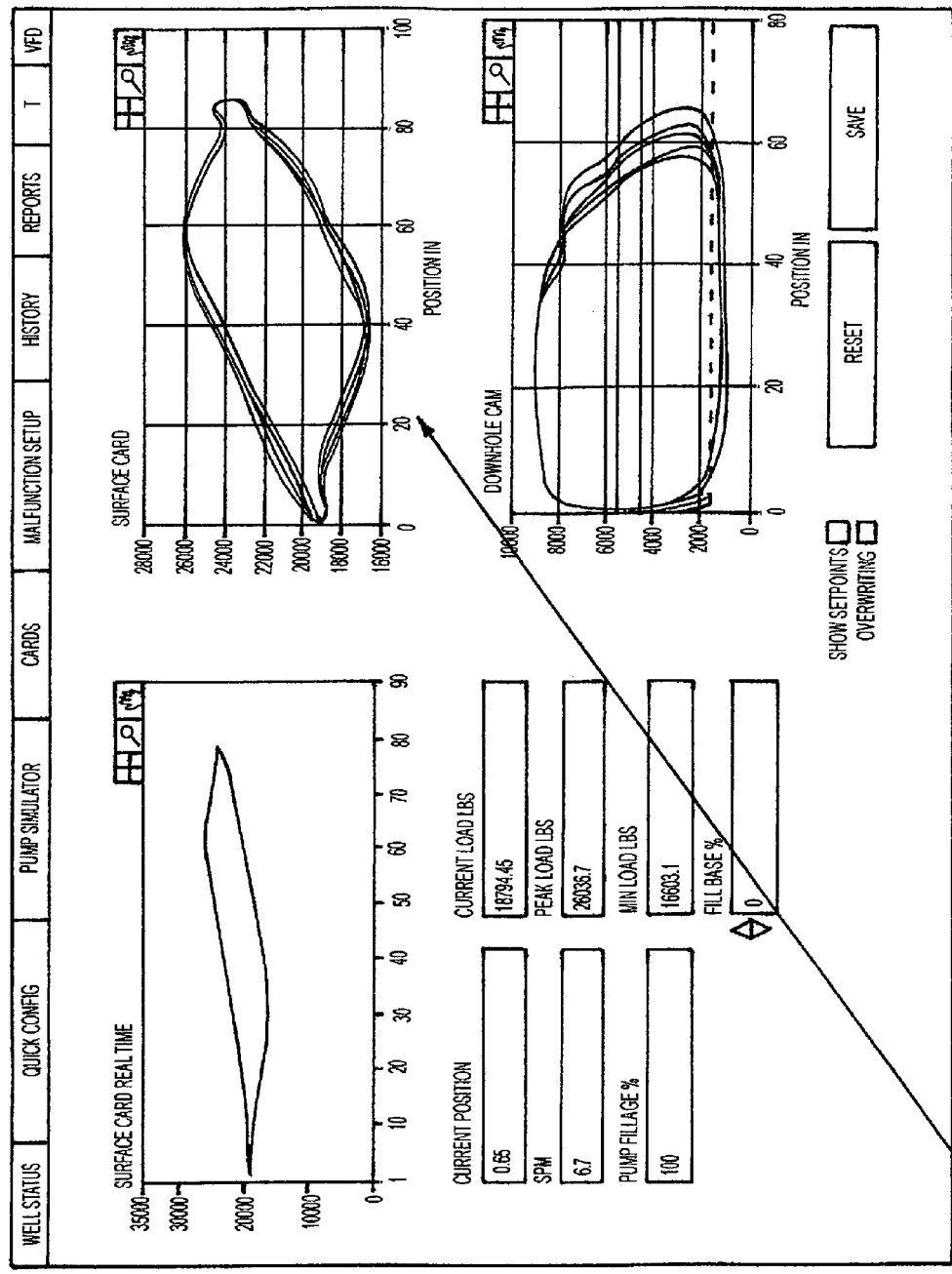
FIG. 3 is a diagram of a dynograph card used in the control and analytics of a rod pumped well using a position measuring device according to the concepts described herein.

Referring now to FIG. 3 an embodiment of a controller display displaying a dynograph card is shown. The dynograph 30 is a visual representation of the load on the rod plotted against the rod position through an entire pumping stroke and can include graphical information for multiple pumping strokes.

Well controllers and dynamometer cards allow for the control and monitoring of the pumping system. A pump system simulator utilizes state of the art electronic processors and graphics, which allows the operator to instantly recognize pump-off and changing well conditions based on the shape of the dynograph. Industry operators are trained to understand the pumping system as they view it on a daily basis including the pumping unit, rods, prime mover, and subsurface pump. Traditionally, the interpretation of dynamometer cards is an art which requires specialized training and years of experience, however new animations that can be created using a system such as is described herein may require no specialized training and only a basic understanding of the pumping system. Dynamometer cards are presented along with the real time simulation for viewing purposes by those that are skilled in the art and desire to view such plots.

System controllers are preferably located at the well-site of a rod pumped well. In multi-well fields it is possible to have a controller on each and every rod pumped well. These controllers can operate as standalone devices or can be connected to a central computer via radio, satellite or some means of remote communication. Remote access allows the ability to monitor and interrogate the controllers without having to travel to the well site. The controllers can be interrogated at the well site by utilizing a local keypad and display, HMI device, or by utilizing a laptop computer. The real time display of the entire rod pumping system with complete diagnostics allows the field operators a quick overview of the health of the pumping system.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system for determining rod position in a rod pumped well comprising:
   a laser unit mounted on an underside of a walking beam of the well, wherein the laser unit transmits a laser beam in an arcuate path as the laser unit pivots up and down with the walking beam; and
   an elongated reflector plate mounted on a sampson post pivotally supporting the walking beam, wherein the laser beam transmitted onto the elongated reflector plate and moves back and forth along a length of the elongated reflector plate as the laser unit pivots up and down with the walking beam; and wherein the laser unit detects reflections of the laser beam from the elongated reflector plate, to determine distances between the laser unit and the elongated reflector plate while the laser unit pivots up and down with the walking beam, wherein the distances between the laser unit and reflector plate are output for use in determining a position of a rod in the rod pumped well.

2. The system of claim 1 wherein the elongated reflector plate is mounted on the sampson post of the rod pumped well under the walking beam.

3. The system of claim 1 wherein the laser unit is mounted between one and two feet from the elongated reflector plate.

4. The system of claim 1 wherein the laser unit calculates the distance between the laser unit and the elongated reflector plate.

5. A method for determining rod position in a rod pumped well comprising:

mounting a laser unit on the well such that the laser unit pivots up and down with a walking beam, wherein the laser unit is configured to transmit a laser beam along an arcuate path as the laser unit pivots with the walking beam;

mounting an elongated reflector plate to a sampson post pivotally supporting the walking beam in a position near the laser unit, wherein the elongated reflector plate reflects the laser beam as the laser beam moves back and forth along a length of the elongated reflector plate as the laser unit pivots with the walking beam; and determining distances between the laser unit and the elongated reflector plate as the laser unit pivots with the walking beam, wherein the distances between the laser unit and elongated reflector plate as determined by the laser unit are output for use in determining a position of a rod in the rod pumped well.

6. The method of claim 5 wherein the elongated reflector plate is mounted on a sampson post of the rod pumped well under the walking beam.

7. The method of claim 5 wherein the laser unit is mounted between one and two feet from the elongated reflector plate.

8. The method of claim 5 wherein the laser unit calculates the distances between the laser unit and the reflector plate.

* * * * *